United States Patent Office 3,494,126
Patented Feb. 10, 1970

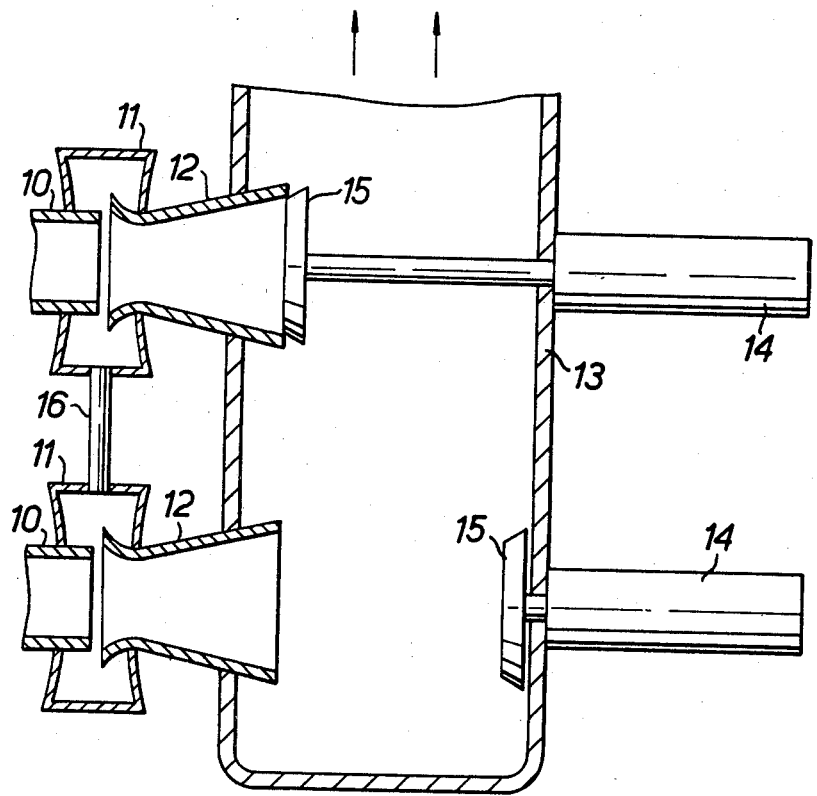

1

3,494,126
MULTIPLE TURBINE EXHAUST SYSTEM
Richard W. Foster-Pegg, Warren, Pa., assignor to Struthers Energy Systems, Inc., a corporation of Delaware
Filed July 3, 1968, Ser. No. 742,308
Claims priority, application Great Britain, July 11, 1967, 31,781/67
Int. Cl. F02g 1/00; F02c 7/02; F01k 23/16
U.S. Cl. 60—39.15                     2 Claims

ABSTRACT OF THE DISCLOSURE

Multiple gas turbines exhausting into a common plenum chamber have plug valves operable to close the tail pipes of non-working turbines. The turbines exhaust through conventional manifolds so that operating turbines draw a vacuum in the manifolds of non-working turbines and draw out any exhaust leakage past closed plug valves.

BACKGROUND OF THE INVENTION

A multiple gas turbine power package is light, easily moved, and not overly expensive for certain applications. Such a power package is flexible and efficient in that individual gas turbines need only be activated as required to satisfy given load conditions.

Each gas turbine may exhaust into a common exhaust plenum from which exhaust heat may be recovered or which may muffle sound but from which exhaust gases pass into the atmosphere. If only one or more of the turbines of a gas turbine generator package is operating, pressure in the common exhaust plenum will be higher than atmospheric so that hot exhaust gases will tend to flow in reverse through non-operating turbines. These hot gases flowing in reverse through stationary turbines can damage their intakes, foul the enclosure, and do considerable other harm.

SUMMARY OF THE INVENTION

Multiple gas turbines exhausting into a common plenum chamber have plug valves operable to close the tail pipes of non-working turbines. The turbines exhaust through conventional manifolds so that operating turbines draw a vacuum in the manifolds of non-working turbines to draw out any exhaust leakage past closed plug valves.

BRIEF DESCRIPTION OF THE DRAWING

The figure is a longitudinal section through broken away tail pipes of two gas turbines shown exhausting into the broken away lower portion of a plenum chamber equipped according to this invention.

DESCRIPTION OF THE PREFERRED EMBODIMENT

As shown in the figure, the tail pipes 10 of two turbines each exhaust through a chamber 11 into an outwardly tapered section 12. The sections 12 lead into a common exhaust plenum 13. Hydraulic, pneumatic, or other cylinders or devices 14 may be activated to thrust the plugs 15 into the ends of the sections 12 of a non-operating turbine. A tube 16 connects the chambers 11 about the tail pipes of all the turbines in a power unit.

When one of two or more turbines is operating, as is the lower turbine in the figure, its plug 15 is retracted. The exhaust velocity of the gases leaving a tail pipe 10 are high so that an operating turbine will draw a vacuum of about 20 inches of water in a chamber 11. This vacuum draws air through the tube 16 to cause a flow of fresh air through the air intake of any inoperative turbine. This fresh air is passed out with the exhaust of any operating turbine. This flow of fresh air insures that any hot gases leaking back past the plug valve 15 will be sucked out by any operating turbines so that such leakage can do no harm.

This low pressure exhaust chamber 11 also permits air flow to be established through a turbine on starting before its exhaust plug 15 is opened to the main exhaust 13. As an engine or turbine is started, the difference between compressor delivery pressure and plenum pressure may be used as a control signal to open the plug valve 15.

While only two turbines are shown exhausting into plenum chamber 13, any number of turbines may be involved in the practice of this invention. The broken away upper portion of chamber 13 could contain a waste heat recovery unit and would contain a sound muffling device in most applications.

What is claimed is:

1. A gas turbine power package comprising, in combination, at least two selectively operated gas turbines having tail pipes, outwardly tapering sections disposed with a space therebetween behind said tail pipes, a chamber disposed about the space between each tail pipe and associated sections, means connecting said chambers for gas flow therebetween, a common plenum into which said gas turbines exhaust through said sections, valve means closing said sections, and means activating said valve means closing sections associated with non-operating gas turbines so that leakage past said valve means will be drawn from the chambers of non-operating gas turbines to the chambers of operating gas turbines.

2. The combination according to claim 1 wherein said valve means are plug valves disposed in said plenum and wherein said means activating said plug valves moves said plug valves in said plenum blocking said outwardly tapering sections.

References Cited

UNITED STATES PATENTS

| | | | |
|---|---|---|---|
| 2,960,821 | 11/1960 | Scherl | 60—39.15 XR |
| 3,306,036 | 2/1967 | Wooler | 60—102 XR |
| 3,373,561 | 3/1968 | Jubb | 60—39.15 |

CARLETON R. CROYLE, Primary Examiner

U.S. Cl. X.R.
60—39.5, 102